United States Patent [19]

Brandt et al.

[11] 4,358,587

[45] Nov. 9, 1982

[54] WATER-SOLUBLE CELLULOSE MIXED ETHERS WHICH CONTAIN A PHOSPHONOMETHYL SUBSTITUENT AND A PROCESS FOR PREPARING SAME

[75] Inventors: Lothar Brandt; Arno Holst, both of Wiesbaden, Fed. Rep. of Germany

[73] Assignee: Hoechst Aktiengesellschaft, Frankfurt am Main, Fed. Rep. of Germany

[21] Appl. No.: 313,351

[22] Filed: Oct. 20, 1981

[30] Foreign Application Priority Data

Oct. 23, 1980 [DE] Fed. Rep. of Germany ....... 3039963

[51] Int. Cl.³ .......................................... C08B 11/193
[52] U.S. Cl. ...................................... 536/90; 536/91
[58] Field of Search ................................... 536/90, 91

[56] References Cited

U.S. PATENT DOCUMENTS

| | | | |
|---|---|---|---|
| 2,979,374 | 4/1961 | Drake et al. | 8/120 |
| 3,388,118 | 6/1968 | Tesoro | 536/62 |
| 3,553,194 | 1/1971 | Verbanac et al. | 536/62 |
| 3,634,394 | 1/1972 | Andreassen | 536/62 |
| 3,652,540 | 3/1972 | Determann et al. | 536/62 |
| 4,020,271 | 4/1977 | Chatterjee | 536/88 |
| 4,310,663 | 1/1982 | Hilbig et al. | 536/91 |

OTHER PUBLICATIONS

"Phosphonomethylation of Cotton", by G. L. Drake, W. A. Reeves, J. D. Guthrie, published in Textile Research Journal, Mar. 1959, pp. 270–275.

*Primary Examiner*—Ronald W. Griffin
*Attorney, Agent, or Firm*—Schwartz, Jeffery, Schwaab, Mack, Blumenthal & Koch

[57] ABSTRACT

Disclosed are water-soluble cellulose mixed ethers which contain (a) at least one substituent from the group comprising alkyl, hydroxyalkyl, carboxyalkyl, sulfoalkyl and dialkylaminoalkyl and (b) a phosphonomethyl substituent and which has a DS of the first substituent(s) other than hydroxyalkyl from about 0.05 to 2.95 and/or an $MS_{HAlk}$ from about 0.5 to 6 and a $DS_{PM}$ from about 0.005 to 0.8. Also disclosed is a process for preparing such cellulose mixed ethers in which, per mole of the cellulose, from about 0.1 to 25 moles of the etherifying agent(s) for producing the substituent(s) under (a), from about 0.05 to 2 moles of halogenomethane phosphonate ions as the etherifying agent for producing the substituent under (b) and from about 0.8 to 12 moles of hydroxide ions are caused to react in a reaction mixture comprising up to about 30 parts by weight, per part by weight of the cellulose, of a mixture which is composed of an inert, preferably water-miscible organic solvent and $H_2O$ and in which the proportion of water ranges from about 3 to 40 percent by weight.

21 Claims, No Drawings

WATER-SOLUBLE CELLULOSE MIXED ETHERS WHICH CONTAIN A PHOSPHONOMETHYL SUBSTITUENT AND A PROCESS FOR PREPARING SAME

BACKGROUND OF THE INVENTION

The present invention relates to water-soluble cellulose mixed ethers which contain a phosphonomethyl substituent and to process for preparing these water-soluble cellulose mixed ethers in an aqueous, alkaline medium containing an organic solvent.

Cellulose ethers which carry an anion-active substituent are used in many processes and fields of application, as water-soluble thickening agents and/or as auxiliaries, e.g., as a protective colloid, flocculating agent, binder and adhesive, dispersing agent or film-forming agent. Among these fields of application are the making of paper, the production and application of building materials, the processing of fibers, the preparation of pharmaceuticals and cosmetics and the production of soaps and detergents, varnishes and paints, and food and luxury food. The best known commercial product of this type of cellulose ether is carboxymethyl cellulose (CMC) which is conventionally marketed in the form of its Na salt (NaCMC). Also gaining a certain importance are other carboxylalkyl ethers or sulfoalkyl ethers of cellulose and mixed ethers which contain further ether groups in addition to the anion-active substituent, normally carboxymethyl. These include, for example, methyl carboxymethyl cellulose (MCMC), hydroxyethyl carboxymethyl cellulose (HECMC) or ethyl hydroxyethyl carboxymethyl cellulose (EHECMC).

Organic phosphonic acids or their derivatives lend themselves particularly well to the purpose of linking polybasic anion-active substituents to the cellulose ether molecule. The reaction of cellulose with reactive, organic phosphonic acids or derivatives thereof (e.g. halogeno-alkane phosphonic acids) results in cellulose ethers which have a phosphonic acid group or one of its salt forms in their ether substituent. These cellulose ethers which contain phosphonic acid groups are normally insoluble in water, because reaction, for example, with halogeno-alkane phosphonic acids to give more than very low degrees of substitution is difficult. However, water-soluble products have also already been disclosed.

In U.S. Pat. No. 2,979,374 or in the paper "Phosphonomethylation of Cotton" by G. L. Drake, W. A. Reeves and J. D. Guthrie, published in Textile Research Journal, March 1959, pages 270 to 275, describe chemically modified, fibrous textile cellulose materials and a process of preparing these materials, in which certain of the hydroxyl groups of the polysaccharide are replaced by $-O-CH_2-PO_3X_2$ groups, wherein X is either H or an alkali metal or $NH_4$. The degree of modification ranges from 0.01 to 4 percent by weight. In the process for the preparation of these products, the fibrous starting material is reacted with an aqeuous solution of an alkali metal salt of chloromethane phosphonic acid or another salt of this acid and an excess of alkali metal hydroxide. The products obtained may further be converted to the free acid derivative or to the corresponding ammonium salts. It is also possible to prepare water-soluble phosphonomethyl ethers of cellulose, if the degree of modification is chosen in such a way that at least 2 percent by weight of phosphorus are introduced. The starting materials mentioned include cotton fibers, cellulose hydrate fibers, aminized cotton fibers, carboxymethylated cotton fibers, paper and sulfoethylated cotton fibers. For the purpose of introducing the phosphonomethyl groups, either a metal salt of chloromethane phosphonic acid itself or of its acid chloride may be used; it is also possible to use the corresponding monoesters or diesters. The aqueous reaction solution contains from 10 to 30 percent by weight of reactive alkali metal hydroxide and from 1 to 30 percent by weight of the alkali metal salt of chloromethane phosphonic acid. The reaction is conducted by allowing the cotton to absorb from 125 to 200 percent by weight of the reaction solution and heating to a temperature from 75° to 115° C. for 5 to 30 minutes or heating to 140° to 160° C. for 2 to 10 minutes. The water-soluble products are obtained from reaction solutions containing from 20 to 25 percent by weight of NaOH and from 10 to 20 percent by weight of chloromethane phosphonic acid, at temperatures from 120° to 150° C. applied for 5 to 30 minutes. In the only example of preparing a water-soluble phosphonomethyl cellulose, cotton is treated with a solution consisting of 35.1 parts by weight of chloromethane phosphonic acid, 96.5 parts by weight of NaOH and 180 parts by weight of water, until it has absorbed 196 percent by weight of the solution. Heating to 140° C. for 30 minutes is followed by washing in water which contains 20 percent by weight of ethanol. Depending on the kind of starting material used, the phosphorus content determined in the water-soluble product amounts to 2.12 or 2.4 percent by weight.

The crosslinked phosphonalkyl celluloses, according to German Offenlegungsschrift No. 26 00 930 (corresponding to U.S. Pat. No. 4,020,271) comprises basic molecules of a kind which, without crosslinking, would themselves be water-soluble, but which are rendered substantially water-insoluble by crosslinking with formaldehyde, epichlorohydrin, dichloroacetic acid, diepoxides or other known difunctional components. With respect to carrying out the etherification stage, reference is made to the previously mentioned U.S. Pat. No. 2,979,374.

German Offenlegungsschrift No. 14 93 227 (corresponding to U.S. Pat. No. 3,388,118) discloses a method of preparing modified polysaccharides, in which chloroacetamido methyl cellulose or a similar compound containing reactive halogen is first prepared, and this intermediate compound is then reacted with trialkyl phosphites. The products obtained are not cellulose ethers; they contain nitrogen and phosphorus in substituent groups. The first reaction stage is run in an aqueous solution of, for example, N-methylol chloroacetamide and the second reaction stage in a solution of the phosphite in dimethyl formamide (DMF). The reaction products are insoluble in water.

The methods for the preparation of ion exchangers according to German Auslegeschrift No. 20 05 407 (corresponding to U.S. Pat. No. 3,634,394) or according to German Auslegeschrift No. 20 05 408 (corresponding to U.S. Pat. No. 3,652,540) can also result in products which carry a phosphonomethyl group. In one method, for example, pearls of regenerated cellulose are reacted in toluene in the presence of benzethonium chloride $[CH_3-C(CH_3)_2-CH_2-C(CH_3)_2-C_6H_4-(O-CH_2-CH_2)_2-N^{\oplus}(CH_3)_2-CH_2-C_6H_5, Cl^{\ominus}]$ with a solution containing NaOH, $NaBH_4$, water and chloromethane phosphonic acid for 16 hours at a temperature of 90° C. The product obtained is insoluble in water.

In the known process for the preparation of water-soluble phosphonomethyl ethers of cellulose (PCM), temperatures exceeding 100° C. must be applied, in order to activate the halogenomethane phosphonic acid or one of its salts, respectively, which is slower to react than other etherifying reagents (for example, monochloro acetic acid). Any water which is present in the reaction medium is largely evaporated in the course of the reaction and, as a result, the etherification reaction proceeds in an almost-dry mixture. Experience has shown that in such "dry" processes in which the alkali cellulose swells slightly, non-uniform etherified products with high proportions of unsubstituted chain portions are (in most cases) obtained. This applies in particular to products which have a low degree of substitution (e.g., a DS of less than 0.4)—as in the present case. If it is intended to prepare water-soluble cellulose ethers, this will lead to products which give turbid, fibrous solutions showing residues, even at degrees of substitution which are actually sufficient to impart solubility in water, and the products are, therefore, unsuitable for many fields of application. The high temperatures employed also have an unfavorable effect on the stability of the polymer chain, since an oxidative chain-disintegration may occur. As a result, the cellulose ethers thus prepared, when dissolved, will yield only low viscosities and are consequently hardly suitable, for example, for use as thickening agents.

The other previously disclosed processes do not lead to water-soluble phosphonomethyl celluloses or to ether groupings, respectively. Furthermore, they are also either conducted at a temperature above 100° C. and with the aid of a "coupling component" or at a temperature below 100° C., but with the addition of several auxiliary substances and at long reaction times.

In U.S. Pat. No. 2,979,374, a description of which has been given above, aminized, sulfoethylated or carboxymethylated cotton fibers are enumerated as starting materials for the phosphonomethylation reaction. However, the only practical example (Example 5) merely mentions an aminized cotton with a nitrogen content of 0.7 percent, and the reaction product which has a $DS_{PM}$ of about 0.1 is still definitely water-insoluble. Therefore, data which are sufficient to define the character of a water-soluble cellulose mixed ether containing a phosphonomethyl substituent and at least one other substituent cannot be inferred from this United States patent.

SUMMARY OF THE INVENTION

It is therefore an object of the present invention to provide novel cellulose mixed ethers which are soluble in water and result in a low residue and in which one of the substituent types comprises a phosphonomethyl group, wherein the starting material used is not a textile form of cotton.

It is a further object of the invention to provide a process for preparing these products, which can be carried out at a comparatively low temperature and without any appreciable chain-disintegration.

In accomplishing the foregoing objects, there has been provided in accordance with one aspect of the present invention a water-soluble cellulose mixed ether comprising a substituted cellulose material having at least one first substituent selected from alkyl, hydroxyalkyl, carboxyalkyl, sulfoalkyl, or dialkylaminoalkyl, more preferably from methyl, ethyl, hydroxyethyl, hydroxypropyl or carboxymethyl, and a phosphonomethyl substituent, and having a DS of the first substituents, excluding hydroxyalkyl, from about 0.05 to 2.95 and/or an $MS_{MAlk}$ of from about 0.5 to 6 and a $DS_{PM}$ of the phosphonomethyl substituent of from about 0.005 to 0.8.

In one preferred embodiment, the first substitutent comprises hydroxyethyl having an $MS_{HE}$ of from about 0.8 to 5 and the phosphonomethyl substituent has a $DS_{PM}$ of from about 0.01 to 0.6.

In another preferred embodiment, the first substituent comprises carboxymethyl having a $DS_{CM}$ of from about 0.2 to 1.5 and the phosphonomethyl substituent has a $DS_{PM}$ of from about 0.01 to 0.6.

In accordance with another aspect of the present invention, there is provided a process for preparing a water-soluble cellulose mixed ether comprising the step of reacting cellulose or a derivative thereof with from about 0.1 to 25 moles, and more preferably from about 0.3 to 8 moles, of a first etherifying agent for producing the first substituent, from about 0.05 to 2 moles, more preferably from about 0.1 to 1 mole, of a second etherifying agent comprising halogenomethane phosphonate ions for producing the phosphonomethyl substituent, and from about 0.8 to 12 moles, more preferably from about 1 to 6 moles, of hydroxide ions as an alkalizing agent, on a per mole of cellulose basis, in a reaction mixture comprising up to about 30 parts by weight, and more preferably from about 5 to 15 parts by weight, per part by weight of cellulose, of a mixture including from about 3 to 40%, preferably from about 10 to 30%, by weight of water and an inert organic solvent, preferably water-miscible and advantageously isopropanol, and is carried out at temperature up to about 100° C.

According to the present invention, the reacting step comprises the steps of alkalizing the cellulose with the alkalizing agent to produce an alkali cellulose intermediate and thereafter etherifying the intermediate in etherification steps with the first and second etherifying agents to produce the cellulose mixed ether.

In one embodiment of the present invention, the alkalizing agent and the first and second etherifying agents are introduced into the reaction mixture simultaneously.

In another embodiment of the present invention, the first and second etherifying agents are introduced into the reaction mixture subsequent to the alkalizing agent.

Further objects, features and advantages of the present invention will become apparent from the detailed description of the preferred embodiments which follows.

DETAILED DESCRIPTION OF PREFERRED EMBODIMENTS

In accordance with one aspect of the invention, water-soluble cellulose mixed ethers are prepared which contain (a) at least one substituent from the group comprising alkyl, hydroxyalkyl, carboxyalkyl, sulfoalkyl and dialkylaminoalkyl and (b) a phosphonomethyl substituent and which have a DS of the first substituent(s), other than hydroxyalkyl, from about 0.05 to 2.95 and/or an $MS_{HAlk}$ from about 0.5 to 6.0 and a $DS_{PM}$ from about 0.005 to 0.8. These cellulose mixed ethers contain, in particular, under (a) a methyl, ethyl, hydroxyethyl, hydroxypropyl and/or carboxymethyl substituent. The preferred cellulose mixed ethers of this kind are those which carry (a) a hydroxyethyl substituent having an $MS_{HE}$ from about 0.8 to 5.0 or a carboxymethyl substituent having a $DS_{CM}$ from about 0.2 to 1.5 and (b) a phosphonomethyl substituent having a $DS_{PM}$ from about 0.01 to 0.6.

The term "water-soluble" denotes that the cellulose mixed ethers of the invention do not contain more than about 10 percent by weight, especially not more than about 5 percent by weight, of water-insoluble constituents. These water-soluble constituents can, for example, consist of non-etherified cellulose and/or of cellulose ether portions in which substitution is either too low or too high. The further distinguishing parameters are to be understood as meaning the following: "DS" is the degree of substitution, i.e., the average number of substituted OH groups per anhydro-D-glucose unit; in cellulose, the DS is in the range from 0.0 to 3. "MS" is the molar degree of substitution, i.e., the average number of moles of the substituting reagent which, per mole of anhydro-D-glucose unit, have an ether-like bond. In cellulose, the "MS" can exceed 3, and it is normally used instead of the DS to characterize such substituents on the cellulose ether which may be produced by multiple substitution on an OH group, i.e., in the present case at the hydroxyalkyl substituent, since the OH groups of the hydroxyalkyl groups (similar to the OH groups of cellulose itself) are also capable of being substituted. "$MS_{HAlk}$" is then the MS related to the hydroxyalkyl substituent, "$DS_{PM}$" is the DS related to the phosphonomethyl substituent, "$MS_{HE}$" is the MS related to the hydroxyethyl substituent and "$DS_{CM}$" is the DS related to the carboxymethyl substituent.

The terms used for the substituents listed above shall preferably have the following meaning: "alkyl" comprises methyl and ethyl, "hydroxyalkyl" comprises hydroxyethyl to hydroxybutyl, "carboxyalkyl" comprises carboxymethyl and carboxyethyl, "sulfoalkyl" comprises sulfomethyl to sulfopropyl and "dialkylaminoalkyl" comprises preferably N,N-disubstituted aminoethyl groups containing N-alkyl groups from $C_1$ to $C_5$ (identical or different). The term "dialkylamino", however, includes also N-terminal heterocyclic groups.

The water soluble-cellulose mixed ethers of the invention include, for example, the following: hydroxyethyl phosphonomethyl cellulose (HEPMC), methyl phosphonomethyl cellulose (MPMC), carboxymethyl phosphonomethyl cellulose (CMPMC), sulfoethyl phosphonomethyl cellulose (SEPMC), diethylaminoethyl phosphonomethyl cellulose (DEAEPMC), hydroxypropyl phosphonomethyl cellulose (HPPMC), hydroxyethyl-hydroxypropyl phosphonomethyl cellulose (HEHPPMC), methyl-hydroxyethyl phosphonomethyl cellulose (MHEPMC), ethyl-hydroxypropyl phosphonomethyl cellulose (EHPPMC) or hydroxyethyl-carboxymethyl phosphonomethyl cellulose (HECMPMC).

In accordance with a further aspect of the invention, a process is provided for preparing the water-soluble cellulose mixed ethers according to the invention. The process is characterized in that, per mole of the cellulose, from about 0.1 to 25 moles of the etherifying agent(s) for producing the substituent(s) under (a),
from about 0.05 to 2 moles of halogenomethane phosphonate ions as the etherifying agent for producing the substituent under (b) and
from about 0.8 to 12 moles of alkali metal hydroxide are caused to react, the reaction mixture comprising, depending on the kind of etherifying agent(s) used to produce the substituent(s) under (a), up to about 30 parts by weight, per part by weight of the cellulose, of a mixture which is composed of an inert, preferably water-miscible organic solvent and water and in which the proportion of water ranges from about 3 to 40 percent by weight.

The procedure followed in a preferred embodiment is such that, per mole of the cellulose, from about 0.3 to 8 moles of the etherifying agent(s) used to produce the substituent(s) under (a), from about 0.1 to 1 mole of halogenomethane phosphonate ions as the etherifying agent used to produce the substituent under (b) and from about 1 to 6 moles of hydroxide ions are caused to react in about 5 to 15 parts by weight, per part by weight of the cellulose, of a mixture which is composed of an inert, preferably water-miscible organic solvent and water and in which the proportion of water ranges from about 10 to 30 percent by weight.

A process for preparing water-soluble phosphonomethyl celluloses without additional substituents is described in U.S. application Ser. No. 313,350, filed Oct. 20, 1981, which is here expressly referred to and incorporated herein by reference. The preparation of mixed ethers of cellulose or, generally, the preparation of cellulose ethers of a kind which do not carry a phosphonomethyl substituent, has been known for many years, in some cases even for many decades, and it is, therefore, not necessary to describe these processes within the scope of the present invention. As an example, however, "Ullmanns Encyklopaedie der technischen Chemie" ["Ullmanns Encyclopedia of Technical Chemistry"], 4th edition, 1975, volume 9, Verlag Chemie, Weinheim, Federal Republic of Germany, keyword "Celluloseaether" [cellulose ethers], pages 192 to 212, is mentioned.

The process of the invention can be carried out discontinuously or continuously in an apparatus of the type conventionally used in cellulose ether chemistry. If the temperature of the reaction mixture is chosen so high that it exceeds the boiling temperature of the solvent/$H_2O$ mixture, it is advisable to run the process in a pressure apparatus. Also in the case of reaction components which are already in a gaseous state under normal conditions (normal pressure, room temperature), it is usual to conduct the process in a pressure apparatus (for example, if ethylene oxide is used as etherifying agent).

The specified composition of the reaction mixture merely gives the sum of the portions of components required for the reaction at the beginning of the etherifying stage. In the case of a separate alkalizing stage, for example, part of the cellulose and of the alkali metal hydroxide is then already present as alkali cellulose, and by the neutralization of the etherifying agent, which is employed in the form of an acid, a hydrolizable acid derivative or a hydrogen salt, additional water is generated. If the etherifying agents are, for example, used in the form of the monosalt or disalt or of another derivative which can be hydrolized under alkaline conditions, the required quantities are naturally higher than the quantities which must be used for the free acid, i.e., the term "halogenomethane phosphonate ions", for example, has been chosen to have a uniform basis for calculation, and to characterize the condition in which the etherifying agent is present in the alkaline medium at the beginning of the reaction.

The specified quantity of "hydroxide ions" is only related to the quantity required for alkalization and etherification. The quantity of "hydroxide ions" which is additionally necessary to form the dianion of the etherifying agent must still be added to this.

The cellulose used is either of natural origin, e.g., cotton linters or wood pulp, or is in the regenerated form, e.g., cellulose hydrate. If possible, the cellulose should have a particle size of less than about 2.5 mm, more particularly, less than about 1 mm, before the reaction is started. This particle size can, for example, be attained by grinding the cellulose supplied in longer fibers into "powders".

The "hydroxide ions" are preferably used as alkali metal hydroxide—normally NaOH, but also KOH or LiOH—in a solid form or dissolved as an aqueous alkali metal hydroxide solution. It is, however, also possible to employ quaternary ammonium bases. Suitable inert organic solvents which are preferably miscible with water are, in particular, isopropanol, acetone, hexane, dioxane, tert.-butanol, or mixtures of these solvents, which may already be in a water-mixed state. If the particularly preferred isopropanol is used as the organic solvent, the mixture of solvent/$H_2O$ should be adjusted so that the proportion of water ranges from about 5 to 30 percent by weight, especially from about 10 to 25 percent by weight. Recovery and reuse of the particularly preferred isopropanol are relatively easy, because the liquid constituents of the etherification mixture, which are mechanically separated from the solid constituents, e.g., by filtering off, decanting or centrifuging, after completion of the etherification, often consist of salt-containing isopropanol/$H_2O$ mixtures which allow an easy purification by distillation so that the organic solvent constituent can be recovered in an environmentally safe way.

Instead of chloromethane phosphonic acid or its monosodium salt or disodium salt, which is preferably used as the etherifying agent for producing the substituent under (b), i.e., for the production of the halogenomethane phosphonate ions, it is also possible to use its derivatives which are hydrolizable under alkaline conditions, e.g., acid chlorides or esters, other soluble salts, such as potassium or ammonium salts or the corresponding bromo- or iodo-methane phosphonic acids or their derivatives or salts.

The preferred etherifying agents for producing the substituent(s) under (a) are methyl chloride, ethyl chloride, ethylene oxide, propylene oxide and/or monochloroacetic acid or a corresponding salt. It is, however, also possible to use butylene oxide-1,2, monochloropropionic acid, chloroethane sulfonic acid, vinyl sulfonic acid, 1-N,N-diethylamino-2-chloroethane or 2,3-epoxypropyl-trimethyl ammonium chloride.

Concerning the substituent under (b), the reaction products are normally first obtained as dibasic salts, and by the addition of an acid, for example, in the case of neutralization with acetic acid up to neutral range (pH from 5 to 8), these dibasic salts can be converted to the monobasic salt form or, for example, in the case of an excess addition of a mineral acid, to the free acid. By adding bases, such as a metal hydroxide or ammonium hydroxide, salts can again be produced from the monobasic salt forms or the free acid, respectively. The same applies naturally also to such substituents under (a) which are first obtained in the form of a salt, for example, the carboxymethyl or the sulfoethyl substituent.

When the process of the invention is carried out in practice, the cellulose is appropriately first alkalized in a mixture of organic solvent, water and alkali metal hydroxide (or quaternary ammonium base) and the etherifying agent is subsequently added in one or several stages (depending on the kind of etherifying agent used). It is, however, also possible to alkalize in the absence of an organic solvent which is then added in the etherifying stage(s) only, or to add the entire quantity of alkali metal hydroxide in the etherifying stage(s) which is/are then, simultaneously, the alkalizing stage(s), i.e., separate alkalizing is not necessary in that case. All stages, no matter whether they are carried out as separate alkalizing or etherifying stages or as a combination of the two stages, are usually conducted with good mixing. In the separate alkalizing stage, room temperature is normally used (from about 15° to 35° C.), while etherification is particularly successfully run at a temperature up to about 100° C., especially up to about 90° C. If alkalization and etherification are carried out in a single stage, room temperature can first be applied for some time, before the temperature is raised to the final temperature required for etherification. If the organic solvent is isopropanol and the process is to proceed without the use of pressure units, it is advisable to operate below the boiling temperature of the 87 percent strength azeotropic mixture of isopropanol and $H_2O$ of 82° C. However, if a gaseous etherifying agent is used (such as ethylene oxide or methyl chloride), pressureless operation is not advisable. Depending on the reaction temperature, the time required in the etherification stage generally ranges between about 30 minutes and 8 hours. The crude product is, preferably after the addition of an acid until the monobasic salt has formed, first freed from the major portion of its liquid constituents, using a separating device (for example, a centrifuge) and, if necessary, adhering salts can then be removed by extraction. After that, the product is dried and can, optionally, be ground, mixed with further components or granulated. These processing, purifying and post-treating methods are conventionally practiced in cellulose ether chemistry and it is, consequently, not necessary to describe them in detail.

The process of the invention can also be run in such a way that a phosphonomethyl cellulose is first separately prepared and is then used instead of cellulose in one or several further etherification reaction(s), or a prefabricated cellulose ether which still contains etherifiable OH groups can be phosphono-methylated instead of cellulose. As a rule, however, such multi-stage processes for the preparation of mixed ethers are less economical than a "one-pot process".

With respect to the phosphonomethyl substituent, the process parameters and the quantitative proportions of the components used or produced are subject to the following basic conditions.

- An excessive water content in the reaction mixture causes a marked reduction in the efficiency of the etherification reaction, but this can partially be compensated for by correspondingly raising the water-miscible solvent portion.
- A water content which is too low, reduces the swelling of the alkali cellulose and will thus lead to a non-uniform substitution.
- An alkali content which is too low, for example, less than 2 moles of NaOH per mole of the etherifying agent used, results in very low substitution yields; the upper limit of the amount of alkali added is mainly determined by technical and economical aspects.
- Greater quantities of extraneous electrolytes, for example, NaCl, which are generated in the reaction or which are present from the start, have the effect of lowering the yield. The same effect is brought about by excessive quantities of etherifying agent and can then only approximately be compensated for by a disproportionately great increase of the portion of alkali metal hydroxide. An unrestricted increase of these quantities is naturally disadvantageous for economical reasons.

The substitution yield of phosphonomethylation, i.e., the actually obtained DS value relative to the molar quantity of the etherifying agent used per mole of anhydro-D-glucose unit in the cellulose, can amount to about 40 percent and above in the process according to the invention. If less than about 0.4 mole of etherifying agent is added, the substitution yield can even be raised to higher values.

The basic conditions for the production of the other substituents are known in the art. In this connection, Ullmann's (see above) is referred to.

The cellulose mixed ethers which can be prepared in the process of the invention may be used in the technical fields which are also known from other anion-active cellulose mixed ethers, for example, HECMC or MCMC.

The products of the invention and the inventive process for preparing these products are described in more detail be reference to the following cellulose mixed ethers. These are the particularly preferred products, HEPMC and CMPMC, which can be prepared by etherification of cellulose with ethylene oxide or monochloroacetic acid and chloromethane phosphonic acid or corresponding salt forms:

HEPMC can be prepared in a "one-pot process". The phosphonomethylating agent is already added during the alkalizing stage, particularly in a proportion of up to about 0.5 mole per mole of the cellulose. As for the rest, the favorable reaction parameters for a normal-type HEC synthesis are observed, with the exception that temperature is preferably raised to 80 to 95° C. for at least about 15 minutes, particularly for at least about 30 minutes. Reaction proceeds in two stages, since a reaction of the phosphonomethylating agent is practically not yet obtained at the initially applied etherification temperatures of up to about 70° C. so that the etherification with ethylene oxide into HEC is already substantially completed before the phosphonomethylation into HEPMC is effected by a further temperature increase. In this process variant, the water content is at least 10 percent by weight, relative to the mixture of $H_2O$ and organic solvent, because a lower water content is unfavorable for the synthesis of mixed ethers carrying the hydroxyl substituent, which can be dissolved into clear solutions and are uniformly substituted. For this reason, a low proportion of phosphonomethylating agent is preferably chosen so that, even at a higher water content, this etherifying stage still results in a satisfactory yield. Since water-solubility of the product is already existent from hydroxyethylation, DS values of phosphonomethylation from about 0.005, particularly from about 0.02 (which are thus significantly lower than in the case of pure water-soluble phosphonomethyl celluloses) are already sufficient to impart anionactive properties to the HEPMC. In contrast with pure phosphonomethyl celluloses, HEPMC products of this kind, which have a relatively low degree of phosphonomethylation are, for example, after the addition of $Ca^{2+}$ ions, not yet separated in flakes from a neutral aqueous solution. Ions of a stronger crosslinking action, however, such as $Al^{3+}$, $Cr^{3+}$ or $Ti^{4+}$ ions can cause flocculation, even of neutral HEPMC solutions.

In the synthesis of CMPMC it is unfavorable to use the two etherifying agents (for example, Na-monochloroacetate and disodium-chloromethane phosphonate) at the same time, because phosphonomethylation is restrained by carboxymethylation. Therefore, a modified "one-pot process" is advantageous, in which only a CMC of a comparatively low $DS_{CM}$ is first prepared. Depending on the value of the degree of phosphonomethylation which is intended to be subsequently achieved, $DS_{CM}$ values from about 0.2 can already by sufficient. Without additional etherification these would give CMC types which are not yet water-soluble or ony incompletely water-soluble. The alkaline reaction suspension is subsequently phosphonomethylated, without intermediate processing.

In the following examples, parts by weight are related to parts by volume as the g to the $cm^3$. Percentages are by weight. The viscosities mentioned are determined with a 2 percent aqueous solution at 20° C., using a Hoeppler viscosimeter.

EXAMPLE 1

50 parts by weight of beech pulp having an average particle size of 0.5 mm are suspended in a pressure-tight kneader in 280 parts by volume (=225 parts by weight) of an 87% strength aqueous isopropanol; then 40 parts by weight of a 50% strength aqueous NaOH solution (=1.7 mole per mole of the cellulose) are added and the suspension is alkalized for 60 minutes with stirring at room temperature. For etherification, 18 parts by weight of the monosodium salt of chloromethane phosphonic acid (=0.4 mole per mole of the cellulose) and 26 parts by weight of ethylene oxide (=2.0 moles per mole of the cellulose) are added, and the reaction is run first for 1 hour at 40° C. and then for 4 hours at 80° C. The reaction mixture is cooled and neutralized with acetic acid, with phenolphthalein serving as the indicator, and the solid reaction products are separated from the liquid constituents. The solid residue is suspended in an 80% strength aqueous isopropanol and the solid phase is again separated from the liquid phase. This procedure is repeated, until the liquid phase is practically salt-free. After drying at 70° C., the solid reaction product is ground into a powder. 62 parts by weight of HEPMC having a $DS_{PM}$ of 0.03 and an $MS_{HE}$ of 1.36 are obtained in the form of the mono-Na-salt. The HEPMC dissolves completely in water and gives a clear solution. The viscosity is 156 mPa·s, and determination of anion-activity yields a positive result (precipitation reaction in a 1% strength aqueous polyethyleneimine solution buffered to weak acid pH by acetic acid.

EXAMPLE 2

100 parts by weight of pine pulp having an average particle size of 0.5 mm are suspended in a stirring autoclave in 860 parts by volume (=675 parts by weight) of 100% strength isopropanol, and after adding a solution of 33 parts of weight of NaOH (=1.4 mole) and 15 parts by weight of the monosodium salt of chloromethane phosphonic acid (=0.2 mole) in 135 parts by weight of water, the suspension is alkalized for 30 minutes with stirring at room temperature. For etherification, 116 parts by weight (=4.5 moles) of ethylene oxide are added and the reaction mixture is heated, in each case for 30 minutes, first to 30° C., then to 70° C. and finally to 90° C. Processing is carried out as described in Example 1, and 160 parts by weight of a HEPMC having a $DS_{PM}$ of 0.075 and an $MS_{HE}$ of 2.5 are obtained in the form of the mono-Na-salt, which is completely soluble in water and gives a clear solution. The viscosity is 1180 mPa·s, and determination of anion-activity yields a positive result.

EXAMPLE 3

50 parts by weight of pine pulp having an average particle size of 0.5 mm are suspended in 1100 parts by volume (=865 parts by weight) of 100% strength isopropanol. Then 205 parts by weight of a 43.5% strength aqueous NaOH solution (=7.7 moles) are added, and the suspension is alkalized for 30 minutes with stirring at room temperature. Etherification is first run for 1 hour at 45° C. with an addition of 14 parts by weight (=0.5 mole) of monochloroacetic acid; then 67 parts by weight (=1.5 mole) of the disodium salt of chloromethane phosphonic acid are added and etherification is continued for another 4 hours at 80° C. Processing is carried out as described in Example 1, but in this case, a 70% strength aqueous isopropanol is used. 73 parts by weight of a CMPMC having a $DS_{CM}$ of 0.35 and a $DS_{PM}$ of 0.5 are obtained as the Na-salt for the carboxymethyl groups and as the mono-Na-salt for the phosphonomethyl groups. The CMPMC is soluble in water leaving a residue of about 0.3% is insoluble constituents. The viscosity is 70 mPa·s.

What is claimed is:

1. A water-soluble cellulose mixed ether, comprising: a substituted cellulose material having at least one first substituent selected from alkyl, hydroxyalkyl, carboxyalkyl, sulfoalkyl, or dialkylaminoalkyl, and a phosphonomethyl substituent, and having a DS of said first substituents, excluding hydroxyalkyl, from about 0.05 to 2.95 and/or an $MS_{HAlk}$ of from about 0.5 to 6 and a $DS_{PM}$ of said phosphonomethyl substituent of from about 0.005 to 0.8.

2. A cellulose mixed ether as defined in claim 1, wherein said first substituent comprises methyl, ethyl, hydroxyethyl, hydroxypropyl or carboxymethyl.

3. A cellulose mixed ether as defined in claim 2, wherein said first substituent comprises hydroxy ethyl having an $MS_{HE}$ of from about 0.8 to 5 and said phosphonomethyl substituent has a $DS_{PM}$ of from about 0.01 to 0.6.

4. A cellulose mixed ether as defined in claim 2, wherein said first substituent comprises carboxymethyl having a $DS_{CM}$ of from about 0.2 to 1.5 and said phosphonomethyl substituent has a $DS_{PM}$ of from about 0.01 to 0.6.

5. A process for preparing a water-soluble cellulose mixed ether as defined by claim 1, comprising the step of:

reacting cellulose or a derivative thereof with from about 0.1 to 25 moles of a first etherifying agent for producing said first substituent, from about 0.05 to 2 moles of a second etherifying agent comprising halogenomethane phosphonate ions for producing said phosphonomethyl substituent; and from about 0.8 to 12 moles of hydroxide ions as an alkalizing agent, on a per mole of cellulose basis, in a reaction mixture comprising up to about 30 parts by weight, per part by weight of cellulose, of a mixture including from about 3 to 40% by weight of water and an inert organic solvent.

6. A process as defined in claim 5, wherein said organic solvent is water-miscible.

7. A process as defined in claim 5, comprising reacting cellulose or a derivative thereof with from about 0.3 to 8 moles of said first etherifying agent for producing said first substituent;

from about 0.1 to 1 moles of said halogenomethane phosphonate ions for producing said phosphonomethyl substituent; and from about 1 to 6 moles of hydroxide ions as an alkalizing agent on a per mole of cellulose basis, and wherein said reaction mixture comprises from about 5 to 15 parts by weight, per part by weight of cellulose, of said second mixture including 10 to 30% by weight of water and said inert organic solvent.

8. A process as defined in claim 5, wherein said organic solvent comprises isopropanol.

9. A process as defined in claim 5, wherein said first etherifying agent for producing said first substituent comprises methyl chloride, ethyl chloride, ethylene oxide, propylene oxide or monochloroacetic acid or a salt thereof, and said second etherifying agent for producing said phosphonomethyl substituent comprises chloromethane phosphonic acid or a salt thereof.

10. A process as defined in claim 1, wherein said first etherifying agent comprises ethylene oxide.

11. A process as defined in claim 10, wherein said first etherifying agent comprises monochloroacetic acid.

12. A process as defined in claim 5, wherein said reacting step comprises the separate steps of alkalizing said cellulose with said alkalizing agent to produce an alkali cellulose intermediate and thereafter etherifying the intermediate in etherification steps with said first and second etherifying agents to produce the cellulose mixed ether.

13. A process as defined in claim 12, wherein said alkalizing agent and said first and second etherifying agents are introduced to said reaction simultaneously.

14. A process as defined in claim 12, wherein said first and second etherifying agents are introduced in said reaction subsequent to said alkalizing agent.

15. A process as defined in claim 5, wherein said reaction is carried out at a temperature up to about 100° C.

16. A process as defined in claim 12, wherein the alkalizing step occurs at room temperature and the first and second etherifying steps occur at a temperature up to about 100° C.

17. A process as defined in claim 5, wherein said hydroxide ions are provided by an alkali metal hydroxide selected from sodium hydroxide, potassium hydroxide or lithium hydroxide.

18. A process as defined in claim 17, wherein said alkali metal hydroxide comprises sodium hydroxide.

19. A process as defined in claim 5, wherein said cellulose is of natural origin.

20. A process as defined in claim 18, wherein said alkali metal hydroxide is in regenerated form.

21. A process as defined in claim 5, wherein the reaction time is from about 0.5 to 8 hours.

* * * * *